Dec. 7, 1965
E. O. RESSLER
3,222,618
STABILIZED DIRECT CURRENT TO ALTERNATING
CURRENT ANALOG CONVERTER
Filed July 9, 1963
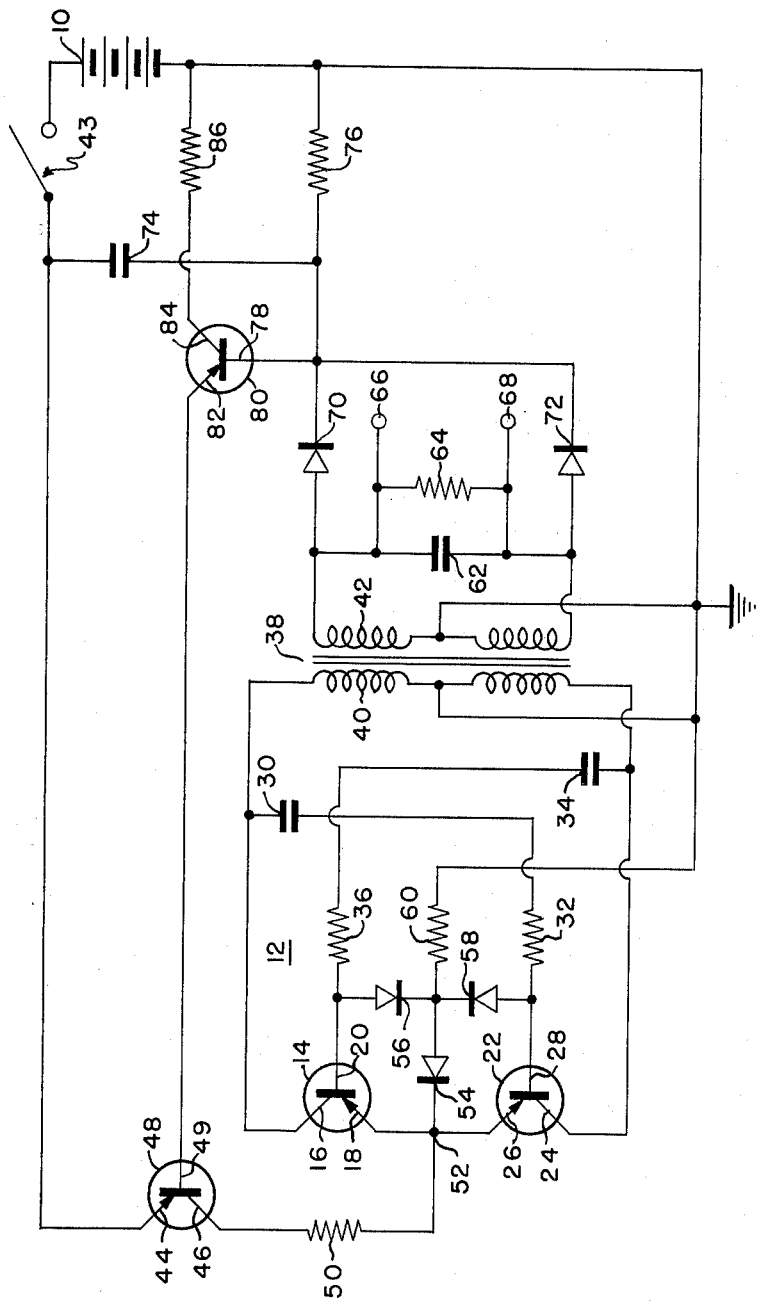
INVENTOR.
ERHARD O. RESSLER
BY Alden D. Redfield
Irwin P. Garfinkle
ATTORNEYS.

United States Patent Office 3,222,618
Patented Dec. 7, 1965

3,222,618
STABILIZED DIRECT CURRENT TO ALTERNATING CURRENT ANALOG CONVERTER
Erhard O. Ressler, Cincinnati, Ohio, assignor to Avco Corporation, Cincinnati, Ohio, a corporation of Delaware
Filed July 9, 1963, Ser. No. 293,743
4 Claims. (Cl. 331—113)

This invention relates to an electronic circuit for converting a direct voltage to a stable proportional alternating voltage. The circuit may be used in conjunction with a regulated direct current supply to obtain a voltage stabilized alternating current output, or it may be used for analog conversion of direct current intelligence signals to proportionate alternating current signals.

Broadly, an object of this invention is to convert a direct voltage into a stable proportionate alternating voltage.

More specifically, the object of this invention is to provide circuitry for generating a stabilized sine wave from a direct current source, the magnitude of the generated sine wave being directly proportional to the magnitude of the direct current supply voltage. The circuit provides automatic compensation for temperature, drift, and load demand variations over a relatively wide range of operating conditions and supply voltages.

Another object of this invention is to provide an alternating current generator, the output of which is controlled by means of a novel feedback system to maintain an output voltage directly proportional to the magnitude of a direct voltage supply.

For other objects and advantages of this invention reference should now be made to the accompanying drawing in which the single figure illustrates a preferred embodiment of the invention.

The illustrated embodiment includes a direct current source of potential illustrated as a battery 10. It is to be understood, however, that the battery 10 may, in fact, be any source of direct voltage, variable or fixed, and under certain circumstances may preferably be a regulated power supply. This invention serves to convert the voltage of the direct current source 10 to an alternating voltage, the magnitude of which is directly proportional to the magnitude of the source 10. For this purpose there is provided an alternating current generator 12 comprising a first transistor 14 having a collector 16, an emitter 18, and a base 20, and a second transistor 22 having a collector 24, an emitter 26, and a base 28. The emitters 18 and 26 of the two transistors are interconnected while the collectors and bases of transistors 14 and 22 are respectively cross-coupled by means of a capacitor 30 and a limiting resistor 32, and by means of a capacitor 34 and a limiting resistor 36. Alternating currents are derived from the generator 12 by means of a transformer 38 having a center tapped primary winding 40 connected across the collectors 16 and 24 of the two transistors. The transformer 38 is also provided with a center tapped secondary winding 42 across which the alternating current output is derived.

The direct voltage supply 10 for the generator 12 is connected by means of a switch 43 through the emitter and collector electrodes 44 and 46 of a transistor 48, and through a series resistor 50 to the junction 52 of the emitters 18 and 26. The direct current circuit is completed to ground through the emitter-collector junction of each transistor and through a respective half of the primary winding 40. The diodes 54, 56, and 58, connected between the emitter and base junctions of the transistors 14 and 22, serve to protect the transistors from excessive base-emitter reverse voltages. A resistor 60, connected between the junction of the three diodes and ground, serves as a turn-on current path from the quiescent condition on starting.

The center tapped secondary winding 42 of transformer 38 is tuned to a desired resonant frequency by means of a capacitor 62. The alternating voltage output developed across the secondary winding is applied across a load resistor 64 and may be derived from the terminals 66 and 68, respectively.

The alternating voltage developed across the secondary winding 42 of transformer 38 is also applied to two diodes 70 and 72 for rectification. The resulting rectified voltage is filtered by means of a capacitor 74 and applied across a resistor 76. The voltage across the resistor 76, the magnitude of which is very nearly equal to the peak alternating current voltage across half of the secondary winding 42, is applied directly to the base 78 of a transistor 80, the emitter 82 of which is connected directly to the base 49 of the controlled transistor 48, its collector 84 being connected to the grounded side of battery 10 through a resistor 86.

When the switch 43 is closed, current flows from the battery 10 through the emitter-collector junction of transistor 48, the series resistor 50, and through the collector-emitter junctions of the transistors 14 and 22, respectively, to ground through one half of the primary winding 40 of transformer 38. One of the transistors 14 or 12 will inevitably conduct ahead of the other and the system will begin to oscillate. Because of the use of the series resistor 50, the voltage at the emitters 18 and 26 is permitted to follow the voltage on the bases 20 and 28, respectively, and this has the effect of substantially reducing the load presented to the transformer 38 by the transistors 14 and 22. As a result, the alternating current developed at the tuned secondary is an excellent sine wave.

As previously noted, the voltage on resistor 76 is approximately equal to the peak alternating current voltage across half of the secondary winding 42 of transformer 38. It will also be seen that the voltage across resistor 76 is equal to the voltage of the source 10 minus the voltage drop across the base-emitter junctions of each of the transistors 80 and 48, respectively. Since the voltage drop across these junctions is quite small compared to the magnitude of the battery voltage, the voltage developed across resistor 76 is essentially equal to the voltage of the source 10 for all operating conditions.

The direct voltage on the resistor 76 controls the voltage at base 78 of transistor 80 which in turn provides current gain and controls the base 49 of transistor 48. Since the collector-emitter junction of transistor 48 is in series with the series resistor 50 and the direct voltage source 10, the voltage across resistor 76 ultimately controls the current flow from the source 10 into the generator 12.

Since the direct voltage across the resistor 76 is referenced to the voltage of the source 10 (minus the voltage drop across the base-emitter junction of transistors 80 and 48), the system is temperature stabilized. If the environmental temperature is reduced, the current gains of transistors 14 and 22 are reduced, and hence the alternating voltage appearing across the secondary winding 42 is reduced. A reduction in alternating voltage across transformer winding 42 tends to lower the direct voltage across the resistor 76. This causes more current to flow through the transistor 80 and which in turn causes an increased current flow through transistor 48, thereby tending to compensate the loss in gain of the transistors 14 and 22 and the generator 12. Higher temperatures produce the opposite effect, and therefore the system tends to keep the output amplitude constant in spite of temperature variations.

Variations in the resistance of load resistor 64 have similar effects since there is a tendency to increase or decrease the output amplitude, and hence the voltage across the resistor 76. Thus, if the source 10 is maintained at a constant voltage; that is, if the source 10 is comprised of a voltage-regulated source, the alternating voltage appearing at the terminals 66 and 68 will remain fixed within the limits of the regulated source 10. On the other hand, if the source 10 is made variable, then the alternating current voltages appearing across the terminals 66 and 68 will vary in a manner directly proportional to the voltage of the source 10.

In an embodiment of this invention actually reduced to practice, the following circuit parameters were incorporated:

Transistors 14, 22, and 80 _____ Type 2N1998.
Transistor 48 _____ Type 2N1039-1.
All diodes _____ Type 1N459.
Capacitors:
   30 _____ .22 µf./50 volts.
   34 _____ .22 µf./50 volts.
   62 _____ .5 µf./200 volts.
   74 _____ 60 µf./3 volts.
Resistors:
   32 _____ 560 ohms.
   36 _____ 560 ohms.
   50 _____ 68 ohms.
   64 _____ 2400 ohms.
   76 _____ 15K ohms.
   86 _____ 15K ohms.

With a regulated power supply of 18 volts for the source 10, an alternating current output of 27 volts at 3,000 c.p.s. was derived. With the particular parameters indicated, the embodiment has an alternating current output variation of less than ±1% from −55° C. to +75° C. and from 0 to 300 mw. output power. It was also found that temperature and load stabilization remained essentially constant over a wide range of variation of voltages in the source 10.

The components of the circuit are protected from destructive damage under conditions of short circuit across the output terminals. Cessation of converter operation under such condition results in transistor saturation and the dissipation of input power results largely across the series resistor 50, and the resistor 50 must be dimensioned to withstand the increased power absorption.

The present invention is useful generally in equipment requiring the analog conversion of a direct current to an alternating current. The direct current source may be fixed or it may vary slowly to convey direct current intelligence, and the variation will be transformed proportionally into the alternating current signal output voltage. Other uses and various modifications and adaptations will at once become apparent to persons skilled in the art, and for that reason it is intended that this invention be not limited to the listed circuit parameters and the specific embodiment illustrated, but only by the following claims as interpreted in the light of the prior art.

What is claimed is:

1. An electronic circuit for converting the direct voltage output of a two-terminal direct current source to an alternating voltage having a stable magnitude proportional to the magnitude of said direct voltage output, the combination comprising:
    a free-running multivibrator including first and second electron flow control devices, each having an emitting electrode, a collecting electrode, and a control electrode, said emitting electrodes being interconnected, each of said collecting electrodes being capacitively coupled to the control electrodes of the other of said devices, and a transformer having center tapped primary and secondary windings, the center taps of said windings being connected to a point of reference potential, the primary winding being connected between said collecting electrodes;
    a control transistor having base, emitter, and collector electrodes;
    a resistive impedance connected between the collector of said control transistor and the junction of said emitting electrodes;
    series circuit connections from one terminal of said source through the collector-emitter junction of said transistor and said resistive impedance to the junction of said emitting electrodes for operatively energizing said multivibrator for generating an alternating voltage, the other of said terminals being connected to said point of reference potential;
    a second transistor having base, emitter, and collector electrodes, the collector electrode of said second transistor being connected to said point of reference potential through a biasing impedance;
    another impedance connected to said base electrode of said second transistor, said another impedance being connected in a series circuit comprising said source and the base-emitter junctions of both of said transistors; and
    means for rectifying said alternating voltage and for applying said rectified alternating voltage across said another impedance.

2. The invention as defined in claim 1 wherein said first and second devices are transistors.

3. The invention as defined in claim 1 wherein said means for rectifying said alternating voltage comprises a rectifier in series with said another impedance connected across at least a portion of said transformer.

4. An electronic circuit for converting the direct voltage output of a direct current source to an alternating voltage having a stable magnitude proportional to the magnitude of said direct voltage output, the combination comprising:
    an alternating current generator comprising first and second transistors, each having base, emitter, and collector electrodes, said emitter electrodes being interconnected, the collector electrode of said first transistor being capacitively coupled to the base electrode of said second transistor, the collector electrode of said second transistor being capacitively coupled to the base electrode of said first transistor;
    a transformer having a center tapped primary winding and a center tapped secondary winding, said center taps being connected to a point of reference potential, said primary winding being connected between the collector electrodes of said first and second transistors;
    a capacitor connected across said secondary winding for tuning said secondary winding to a desired resonant frequency;
    a third transistor having base, emitter, and collector electrodes;
    a resistor connected between the collector of said third transistor and the junction of the emitters of said first and semond transistors, said source being connected between said point of reference potential and the emitter of said third transistor;
    first and second oppositely poled rectifiers connected in series across said secondary winding;

a direct current impedance connected between the junction of said rectifiers and said point of reference potential;

a fourth transistor having base, emitter, and collector electrodes, the collector electrode of said fourth transistor being connected to said point of reference potential through a biasing resistor, the emitter electrode of said fourth transistor being connected to the base electrode of said third transistor, and the base electrode of said fourth transistor being connected to the junction of said rectifiers and said direct current impedance.

References Cited by the Examiner

UNITED STATES PATENTS 2,959,726  11/1960  Jensen.

NATHAN KAUFMAN, *Acting Primary Examiner.*

ROY LAKE, *Examiner.*

S. H. GRIMM, *Assistant Examiner.*